Figure 1:
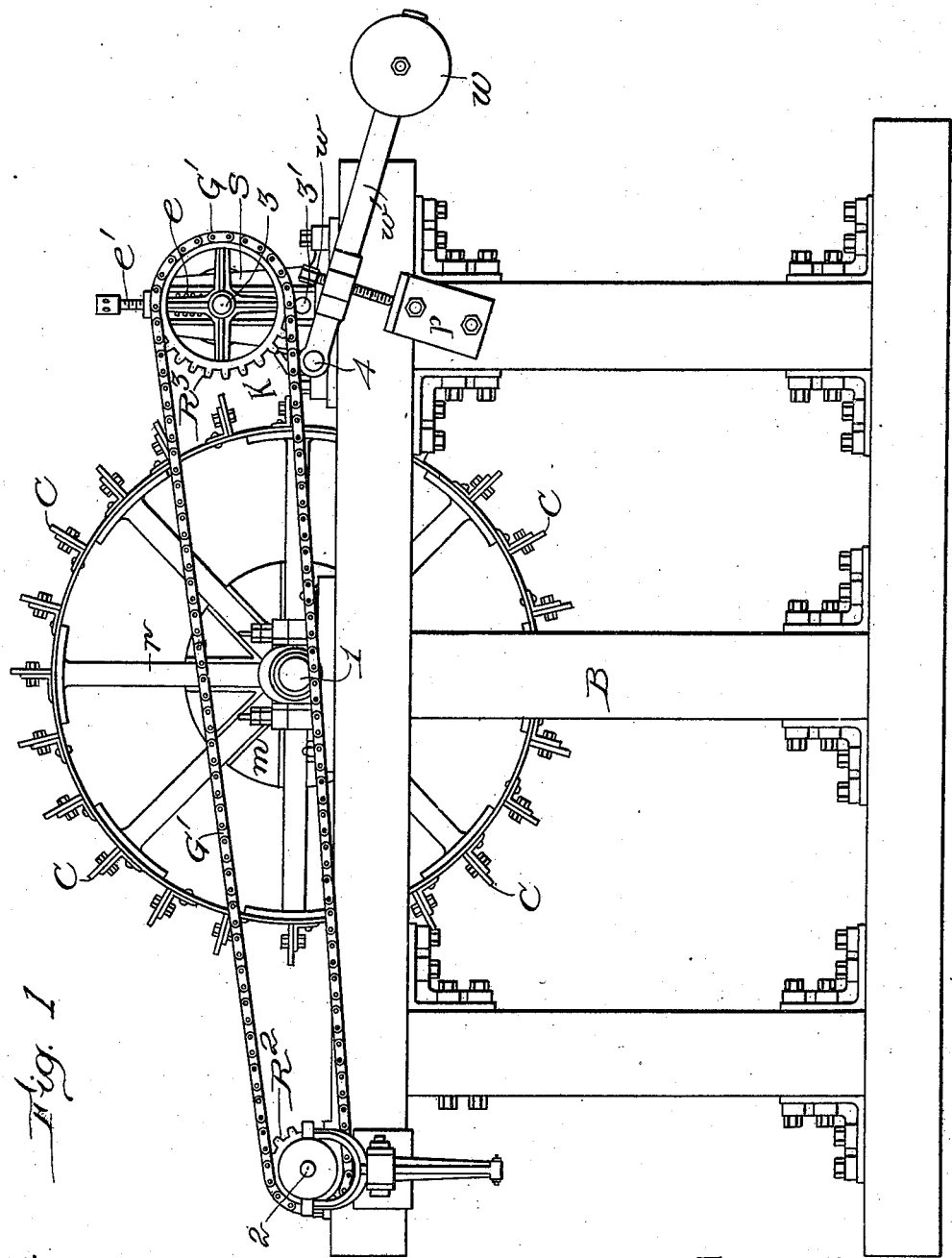

V. R. BARRIENTOS.
HEMP STRIPPING MACHINE.
APPLICATION FILED OCT. 29, 1908.

983,867.

Patented Feb. 14, 1911.

2 SHEETS—SHEET 1.

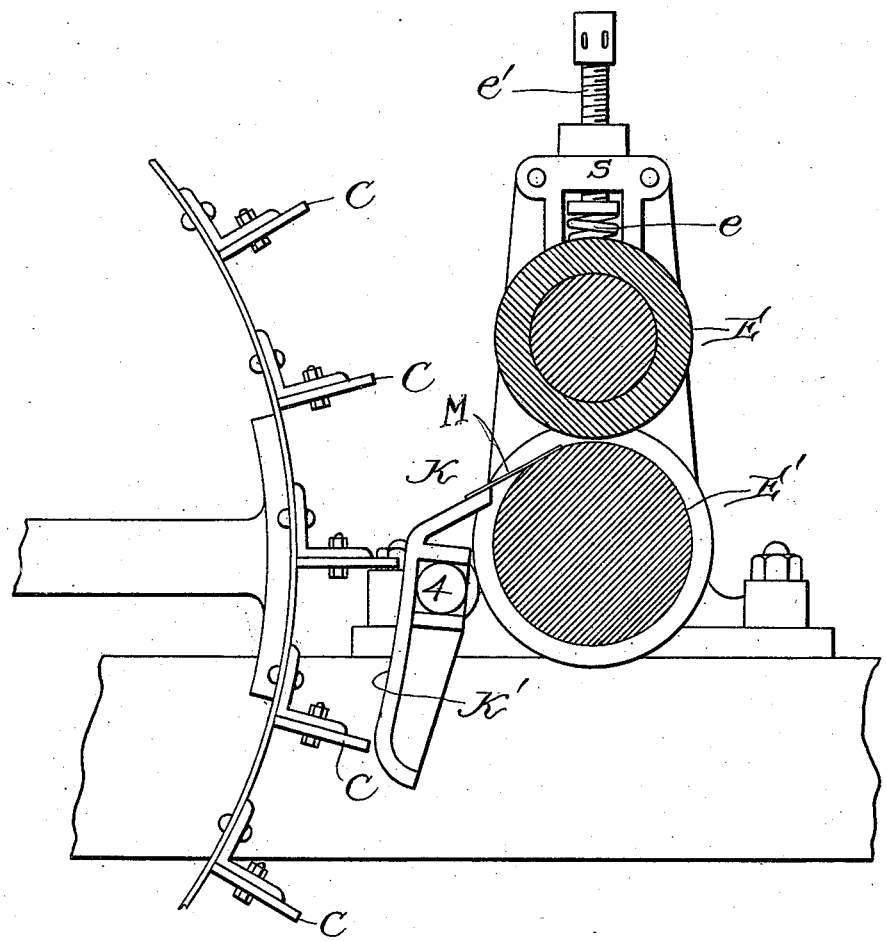

UNITED STATES PATENT OFFICE.

VICENTE REYES BARRIENTOS, OF MAMBAJAO, PHILIPPINE ISLANDS.

HEMP-STRIPPING MACHINE.

983,867. Specification of Letters Patent. Patented Feb. 14, 1911.

Application filed October 29, 1908. Serial No. 460,170.

*To all whom it may concern:*

Be it known that I, VICENTE REYES BARRIENTOS, a citizen of the Philippine Islands, and resident of Mambajao, in the Province of Misamis, Philippine Islands, have invented new and useful Improvements in Hemp-Stripping Machines, of which the following is a specification.

My invention relates to machines for separating the pulpy and woody constituents of the stalks of hemp or similar plants from the fibers thereof which constitute the more valuable portion of their structure, and consists in improvements in the feeding, guiding and supporting devices of machines of this character.

In the drawings hereto annexed, which illustrate an example of my invention,—Figure 1 is a side elevation of a defibering machine; and Fig. 2 is a view on an enlarged scale, partly in section, of the feeding, guiding and supporting devices for the fibrous stalks.

Referring to Fig. 1 which shows the principal or characteristic elements of a machine of this general type, B is a frame on which the shaft 1 is mounted, the said shaft carrying a drum furnished at its periphery with stripper blades C. This drum is caused to rotate at a suitable speed, being driven by any suitable means. The feed rolls which feed the fibrous stalks into the machine are mounted in standards S at one end of the frame and are shown in Fig. 2 in cross section at E and E', the roll E being by preference mounted in vertically movable bearings which are under the stress of springs such as $e$ these being subject to adjustment as by adjusting screws $e'$. These rolls E and E' are driven in any suitable manner, the mode being indicated in Fig. 1 wherein appears a sprocket wheel $R^3$ keyed to the shaft 3 on which is mounted the roll E. This sprocket wheel is driven by the chain G' which meshes with another sprocket wheel $R^2$ which is mounted on the shaft 2 at the other end of the machine. The source of power from which these parts derive motion is not herein shown since it may be any desired or convenient driving mechanism.

Referring now to Fig. 2: Between the rolls E, E' and the stripper blades C there is mounted the apron K. This apron is fixed to a shaft 4 and has a depending portion K' which extends downward and into close proximity to the path of the edges of the stripper blades C. The upper portion of the apron K is inclined toward the roll E' and is provided with a flexible plate M which bears upon the surface of the lower roll E'. Thus, the apron K is capable of oscillation on the pivot furnished by the shaft 4 while the plate M remains in contact with the surface of the roll E. The movements of the apron K are adjusted and controlled by means of the devices shown in Fig. 1. The arm $w'$ is secured to the shaft 4 and carries the weight W which is slidable and adjustable on the arm $w'$. An adjusting screw $w$ is threaded through the arm $w'$ and bears against a stop $p$ which is fixed to the frame of the machine.

The oscillating surface of the depending portion K' and the inclined upper portion of the apron K to which the flexible plate M is attached stand at an obtuse angle to each other forming a shoulder at the line of junction of these surfaces. This shoulder is eased or rounded slightly but is sufficiently abrupt to serve as a support for the stalk and as an edge on which the stalks are broken by the action of the blades C. The rapid succession of strokes of the blades against the stalks firmly supported by the shoulder on the apron K insures repeated sharp fractures of the woody portions of the stalks so as to comminute them and facilitate their subsequent complete separation and removal from the fiber. The depending portion K' will be adjusted by means of the screw $w$ so that a desired minimum of clearance between the apron and blades C will be maintained; on the other hand, whenever the presence of stalk material requires it, the apron K may turn upon the shaft 4 swinging the depending portion K' away from the blades C, the weight W always tending to restore the apron K to its normally adjusted position and maintaining a suitable pressure with which the stalk material is held against the action of the blades C. The flexible plate M rests upon the roll E' constantly in spite of oscillations of the apron K, so that the proper guidance of the crushed stalks from between the rolls E and E' to the apron K will always be insured.

What I claim and desire to secure by Letters Patent is:

1. In a stripping machine for hemp and similar fiber stalks, the combination of rotatively mounted stripper blades, feed rollers, a supporting apron pivotally mounted between the rollers and stripper blades, having a depending portion below the pivotal mounting, a shoulder adjacent to the pivotal mounting, an upper portion extending toward the feed rolls, a flexible plate secured to the upper portion of the apron, bearing on the lower feed roll, and yielding means to hold the lower portion of the apron pressed toward the stripper blades.

2. In a stripping machine for hemp and similar fiber stalks, the combination of rotatively mounted stripper blades, feed rollers, a supporting apron pivotally mounted between the rollers and stripper blades, having a depending portion below the pivotal mounting and an upper portion terminating in a flexible plate which bears on the lower feed roll, and yielding means to hold the lower portion of the apron pressed toward the stripping blades.

V. REYES BARRIENTOS.

Witnesses:
M. COMEPINI,
PEDRO PEÑALOSA.